(12) United States Patent
Johnson

(10) Patent No.: US 9,648,858 B2
(45) Date of Patent: May 16, 2017

(54) NET WITH SNARE CLOSURE

(71) Applicant: Rory Johnson, Miami, FL (US)

(72) Inventor: Rory Johnson, Miami, FL (US)

( * ) Notice: Subject to any disclaimer, the term of this patent is extended or adjusted under 35 U.S.C. 154(b) by 65 days.

(21) Appl. No.: 14/728,342

(22) Filed: Jun. 2, 2015

(65) Prior Publication Data

US 2016/0353722 A1    Dec. 8, 2016

(51) Int. Cl.
| | |
|---|---|
| *A01K 77/00* | (2006.01) |
| *A01K 74/00* | (2006.01) |
| *A01K 75/00* | (2006.01) |
| *A01K 69/10* | (2006.01) |
| *A01K 61/59* | (2017.01) |

(52) U.S. Cl.
CPC .............. *A01K 74/00* (2013.01); *A01K 61/59* (2017.01); *A01K 69/10* (2013.01); *A01K 75/00* (2013.01); *A01K 77/00* (2013.01)

(58) Field of Classification Search
CPC ...................................................... A01K 77/00
USPC ................................................... 43/12, 11, 7
See application file for complete search history.

(56) References Cited

U.S. PATENT DOCUMENTS

| | | | | |
|---|---|---|---|---|
| 771,362 | A * | 10/1904 | Ellsworth ............... | A01K 77/00 43/11 |
| 878,529 | A * | 2/1908 | Holmes .................. | A01K 77/00 43/12 |
| 959,555 | A * | 5/1910 | Koberstein ............ | A01K 77/00 43/12 |
| 1,340,874 | A * | 5/1920 | Brown ................... | A01K 77/00 43/12 |
| 1,420,396 | A | 6/1922 | Warren, Sr. | |
| 1,742,550 | A * | 1/1930 | Mann ..................... | A01K 77/00 43/12 |
| 1,841,956 | A | 1/1932 | Juergens | |
| 2,115,082 | A * | 4/1938 | Phillips ................. | A01K 77/00 43/12 |
| 2,124,952 | A * | 7/1938 | Norris .................... | A01K 77/00 43/12 |
| 2,197,921 | A * | 4/1940 | Brown ................... | A01K 77/00 43/12 |

(Continued)

FOREIGN PATENT DOCUMENTS

| | | | | |
|---|---|---|---|---|
| CA | 1203687 A | * | 4/1986 | ............. A01K 77/00 |
| FR | 2714794 A1 | * | 7/1995 | ............. A01K 97/14 |

(Continued)

OTHER PUBLICATIONS

Translation of JP10-234285.*
Retractable Fishing Hand Net/Snaer, www.amazon.com, circa 2014.
The Ambush, wwww.charkbait.com, circa 2014.
Rhombus Mesh Hole, www.amazon.com, circa 2014.

*Primary Examiner* — Darren W Ark
(74) *Attorney, Agent, or Firm* — Robert C. Kain, Jr.

(57) ABSTRACT

A hand-held underwater net assembly with a snare closure that easily and rapidly closes the netting to prevent fish and crustaceans from escaping. The net assembly ideally includes a brightly colored net closure cord which serves to draw the netting together and close the netting when the snare handle and telescopic draw stem are proximally pulled outward and retracted by a user. The extension of the handle of the net assembly, pulls the netting into a closed position. The brightly colored net closure cord makes it easy for the underwater user to determine when the net is in the closed position and the catch is securely contained within the netting.

14 Claims, 8 Drawing Sheets

(56) References Cited

U.S. PATENT DOCUMENTS

| | | | |
|---|---|---|---|
| 2,457,922 A | 1/1949 | Robinson | |
| 2,486,233 A * | 10/1949 | Wallingford | A01K 77/00 43/12 |
| 2,630,646 A * | 3/1953 | Jensen | A01K 77/00 43/12 |
| 2,724,920 A * | 11/1955 | Boehm | A01K 77/00 43/12 |
| 2,727,328 A * | 12/1955 | Dunton | A01K 77/00 43/12 |
| 3,478,463 A | 11/1969 | Ruter | |
| 4,031,650 A * | 6/1977 | Popeil | A01K 77/00 43/12 |
| 4,446,646 A * | 5/1984 | van't Veld | A01K 77/00 43/12 |
| 4,516,347 A | 5/1985 | Dickie | |
| 4,619,065 A * | 10/1986 | Jones | A01K 77/00 43/12 |
| 4,776,129 A * | 10/1988 | Kelly | A01M 3/002 43/133 |
| 4,815,227 A * | 3/1989 | Flanders, Sr. | A01K 77/00 43/12 |
| D319,681 S | 9/1991 | Mengo | |
| 5,237,768 A | 8/1993 | Kiekhafer et al. | |
| 5,385,666 A * | 1/1995 | Perlsweig | E04H 4/1609 43/12 |
| 5,442,875 A * | 8/1995 | Brundage | A01K 77/00 43/11 |
| 5,501,026 A * | 3/1996 | Bryant | A01K 77/00 43/12 |
| 5,822,908 A | 10/1998 | Blanchard | |
| 6,065,239 A | 5/2000 | Thomas et al. | |
| 6,260,302 B1 * | 7/2001 | Blaschke | A01K 77/00 43/12 |
| 6,446,378 B1 * | 9/2002 | Welch | A01K 77/00 43/12 |
| 6,598,335 B2 * | 7/2003 | Akhtar | A01K 23/005 43/12 |
| 6,655,072 B2 * | 12/2003 | Blaschke | A01K 77/00 43/12 |
| 6,840,000 B2 * | 1/2005 | Akhtar | A01K 77/00 43/12 |
| 7,395,629 B1 * | 7/2008 | Thomas | A01K 77/00 43/11 |
| 8,356,443 B1 * | 1/2013 | Hume | A01K 77/00 43/11 |
| 8,516,737 B2 | 8/2013 | Hume | |
| 8,794,475 B1 * | 8/2014 | Daniels | A01K 77/00 43/12 |
| 8,857,098 B2 * | 10/2014 | Marks | A01K 77/00 43/12 |
| D764,012 S * | 8/2016 | Johnson | D22/135 |
| 2002/0017049 A1 | 2/2002 | Millett et al. | |
| 2004/0144014 A1 * | 7/2004 | Abel | A01K 77/00 43/11 |
| 2005/0091905 A1 * | 5/2005 | Larson | A01K 77/00 43/11 |
| 2005/0229469 A1 * | 10/2005 | Able | A01K 77/00 43/12 |
| 2006/0260172 A1 * | 11/2006 | Hufe | A01K 77/00 43/5 |
| 2010/0132242 A1 * | 6/2010 | Emter, Jr. | A01K 77/00 43/11 |
| 2011/0094145 A1 * | 4/2011 | Marx | A01K 77/00 43/12 |
| 2013/0091755 A1 | 4/2013 | Marks | |
| 2014/0339236 A1 * | 11/2014 | Daniels | A01K 77/00 220/560 |

FOREIGN PATENT DOCUMENTS

| | | | |
|---|---|---|---|
| GB | 1533695 A * | 11/1978 | A01K 77/00 |
| GB | 2 192 321 | 1/1988 | |
| JP | 10234285 A * | 9/1998 | |
| JP | 2004008199 A * | 1/2004 | |
| JP | 2011019492 | 7/2009 | |
| JP | 2011019492 A * | 2/2011 | |
| SU | 973091 A1 * | 11/1982 | |
| WO | WO 85/01859 | 5/1985 | |

* cited by examiner

NET WITH SNARE CLOSURE

This is a regular patent application pursuant to 35 U.S.C. §111(a).

The present invention is a net with a snare closure. The netting closes to prevent the release of captured sea life such as lobster, crabs and large fish. The net assembly is a hand-held underwater net with a snare closure, wherein when the user pulls a proximal handle piece away relative to a distal handle piece, the snare closes as the first handle piece of the net assembly is extended.

BACKGROUND OF THE INVENTION

Nets are known and widely used to capture fish, crustaceans, and other sea life and transport them to the surface of the water. Upon capture, the sea life attempts to escape the net. Accordingly, it is desired to have a net with a snare closure that can close the netting and prevent the escape of the sea life.

Lobster fishing is an example where a net is predominately used to catch the prey. Lobsters live on the sandy bottom of the ocean, often hiding in coral, rocks or burrows. A net allows divers or fishers to be able to catch the lobster by trapping the lobster in the net. However, after the lobster is in the net, it is often difficult to prevent its escape through the open portion of the net. A net with a easy to operate snare closure underwater is desired to ensure the lobster does not escape.

Nets that are capable of closing can be technically advanced and are often times difficult to operate under water due to their complexity. Divers and fishers use nets that can close underwater to capture sea life. A simple to operate underwater closeable net is needed to capture and retain sea life, especially lobster. Lobster can escape from a net quickly due to their natural instinct and speed in swimming to avoid danger. A simple to use hand-held underwater lobster net that closes quickly is desired and needed.

Automatic snares are known in the fishing industry. These snares require a significant amount of dexterity to be effectively used underwater to catch sea life, namely lobsters. The snares do not include a net, thus require a user to "lasso" the sea life and activate the snare to close around it. Not only are automatic snares difficult to use, they are considerably more complex and more expensive than the net with the snare closure of the invention. Moreover, automatic snares are dangerous due to the automated activating feature of the snare. Such automatic action can cause accidents and severe injuries to both adults and children.

Attempt have been made to make a closeable net, however, the resulting nets are too complex to be easily and reliably used underwater. For example, U.S. Pat. No. 5,501,026 to Bryant discloses a hand-held underwater lobster net. The draw line engages circumferentially the net at a location parallel to, and spaced from, the hoop to close the net. The draw line is attached to the net through a plurality of eyelets. The net is closed through activation of a trigger device. There is a mechanism in the handle that causes retraction of a predetermined section of draw line to within the handle upon activation. The handle of the net remains a fixed length. A pulley is located in the handle to ensure that an adequate length of draw line is retractable, while permitting a short handle to be used. The closed net is returned to an open position in a controlled manner through use of a rachet gear near the entry of the draw line to the handle. The mechanics of this device are complex, which can lead to failure when used underwater. Water, especially saltwater, can damage the complex mechanics and impair the function of the device. See also U.S. Pat. No. 5,822,908.

U.S. Patent Publication No. 2010/0132242 to Emter, Jr. discloses a closeable net. The net includes a resilient member coupled to the handle portion by way of a collar that slidably engages the handle portion along the length of the handle. The handle of this net is a fixed length. By slidably engaging the handle, the collar determines an open or closed configuration for the net assembly. The resilient member is coupled to a frame attachment portion of the net and functions like a drawstring to close the net. The ability of the net to close is limited by the size of the frame and the ability of the net to stretch from the frame to the closed position because the net is fixed on the frame with the same portion of netting that is being drawn into the closed position.

U.S. Pat. No. 6,598,355 discloses an object catcher. The object catcher includes a support shaft and a sheet portion arranged adjacent to the distal end of the support shaft. The sheet portion defines a periphery. A line is slidably connected to the sheet portion and the ends extend parallel to the support shaft. Pulling the line from the distal end of the support shaft causes the sheet portion to be gathered and closed. The handle of this object catcher remains a fixed length.

OBJECTS OF THE INVENTION

It is an object of the present invention to provide a simple hand-held underwater net with a snare closure that easily and rapidly closes the netting to prevent fish and crustaceans from escaping. The net assembly ideally includes a brightly colored net closure cord (for example, orange) which serves to draw the netting together and close the netting when the snare handle is proximally pulled outward and retracted by a user. The netting may be a contrasting color, such as green. The extension of the handle of the net assembly pulls the netting into a closed position. The brightly colored net closure cord makes it easy for the underwater user to determine when the net is in the closed position and the catch is securely contained within the netting.

It is a further object of the invention to provide a simple hand-held underwater net with a snare closure that is not mechanically complex. Complex mechanics either tend to fail during long term use in saltwater conditions or they are too complex for a user to employ while underwater fishing with limited visibility, mobility and dexterity. A simple underwater net with an easy to use snare closure is desired.

SUMMARY OF THE INVENTION

A hand-carried fish and lobster net assembly with a snare closure includes a net handle adapted to be held by a user and a net frame attached to the net handle. The netting is attached to the net frame and secured to a distal end of a net handle wherein a weave of the netting forms an area of containment. A telescopic draw stem or handle piece is slidably engaged inside the net handle. A proximal end of the draw stem defining a snare handle wherein the telescopic draw stem and the net handle have a textured surface. The telescopic draw stem and the net handle are frictionally engaged together (the stem telescopically sliding into and out of the net handle) to resist movement there between due to frictional engagement of the telescopic draw stem and the net handle surfaces. A spring loaded button on the distal end of the telescopic stem (inside the net handle) frictionally engages the interior surface of the net handle to further resist movement there between due to frictional engagement of the spring loaded button on the textured interior surface of the net handle.

The net assembly also includes a net closure cord composed of a bright red or orange color and sheathed or running within the telescopic stem and the net handle. The net closure cord extends outboard beyond the distal ends of both the telescopic draw stem and the net handle and forms a continuous loop into the netting. The net closure cord is attached to the draw stem snare handle, extends through the net handle, and the continuous loop of net closure cord is threaded through the netting circumferentially midway through the vertical weave of the netting. To close the netting, the draw stem snare handle is proximally pulled by a user (relative to the net handle), causing the net closure cord to draw the netting together to a closed position as the draw stem snare handle are retracted from the net handle thereby increasing the entire length of the net assembly.

Further details and embodiments of the invention include a hand-carried fish and crustacean net assembly with a snare closure for use underwater to form a containment area from which a fish and crustacean cannot escape comprising a net handle adapted to be held by a user, wherein the net handle is composed of an elongated hollow tube of textured aluminum. A net frame is attached to the net handle and netting is attached to the net frame wherein a weave of the netting forms an area of containment that is substantially open at the opening of the net frame. A telescopic draw stem is composed of an elongated hollow tube of textured aluminum wherein the telescopic draw stem slidably engages inside the net handle with a proximal end defining a snare handle. The telescopic draw stem and the net handle are frictionally engaged together to resist movement there between due to frictional engagement of the textured aluminum surfaces of the telescopic draw stem and the net handle.

A spring loaded button is on the distal end of the telescopic draw stem which frictionally engages the inboard or interior textured surface of the net handle to resist movement there between due to frictional engagement of the spring loaded button and the net handle textured surface. An internal spring loaded button provides a lock between the telescoping draw stem and the net handle. A net closure cord composed of a bright red or orange colored plastic, is attached to the snare handle and is partially sheathed within the telescopic draw stem and the net handle. The net closure cord extends beyond the telescopic draw stem and the net handle in the form of a continuous loop that is threaded through the netting circumferentially, midway through the weave of the netting. To close the netting, the snare handle is proximally pulled by a user, causing the net closure cord to draw the netting together into a closed position as the snare handle and telescopic draw stem are retracted from the net handle thereby increasing the entire length of the net assembly by about 5 to 10 inches.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

Figure 1:
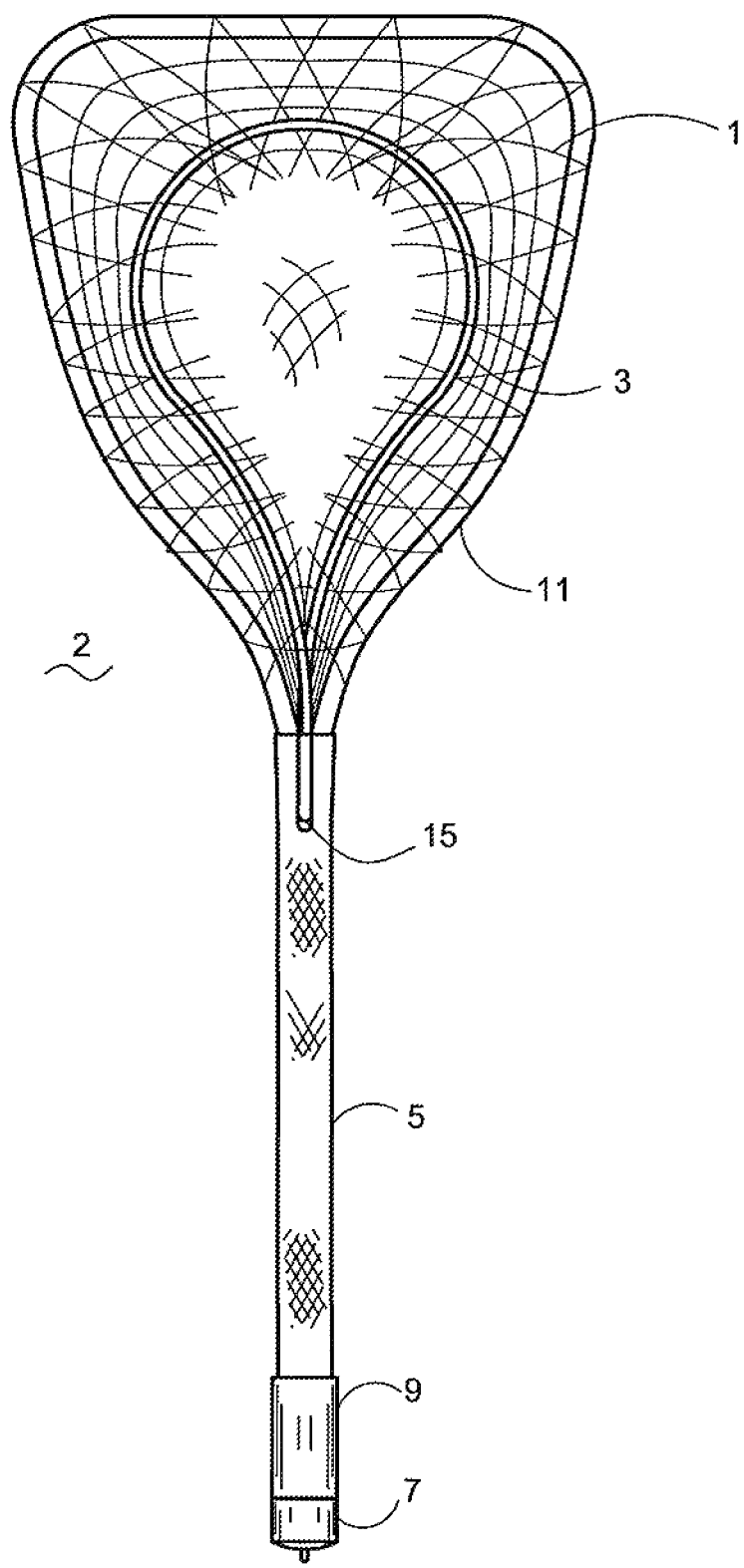
FIG. 1 is a top view of the net assembly.
Figure 4:
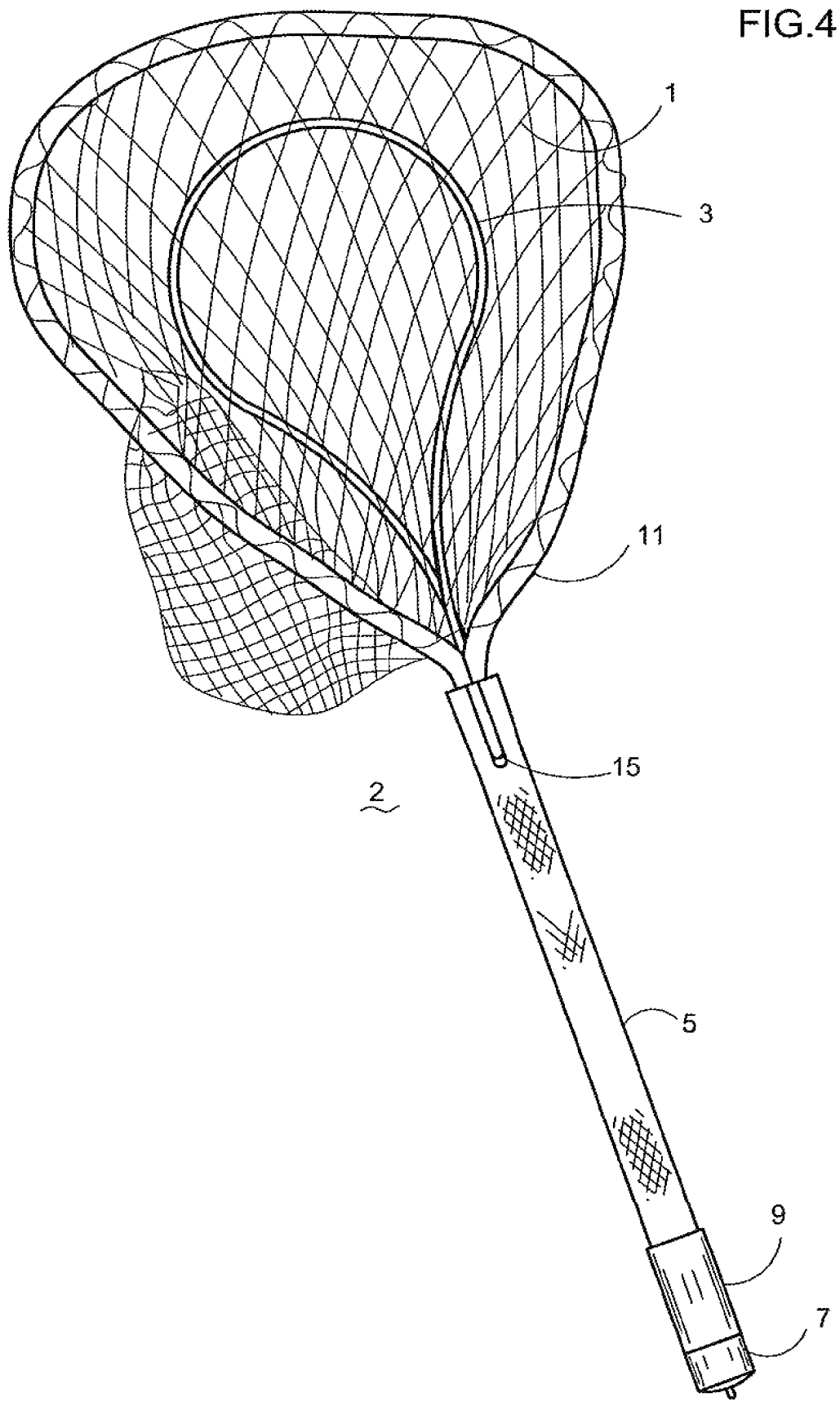
FIG. 4 is a perspective view of the net assembly.
Figure 5:
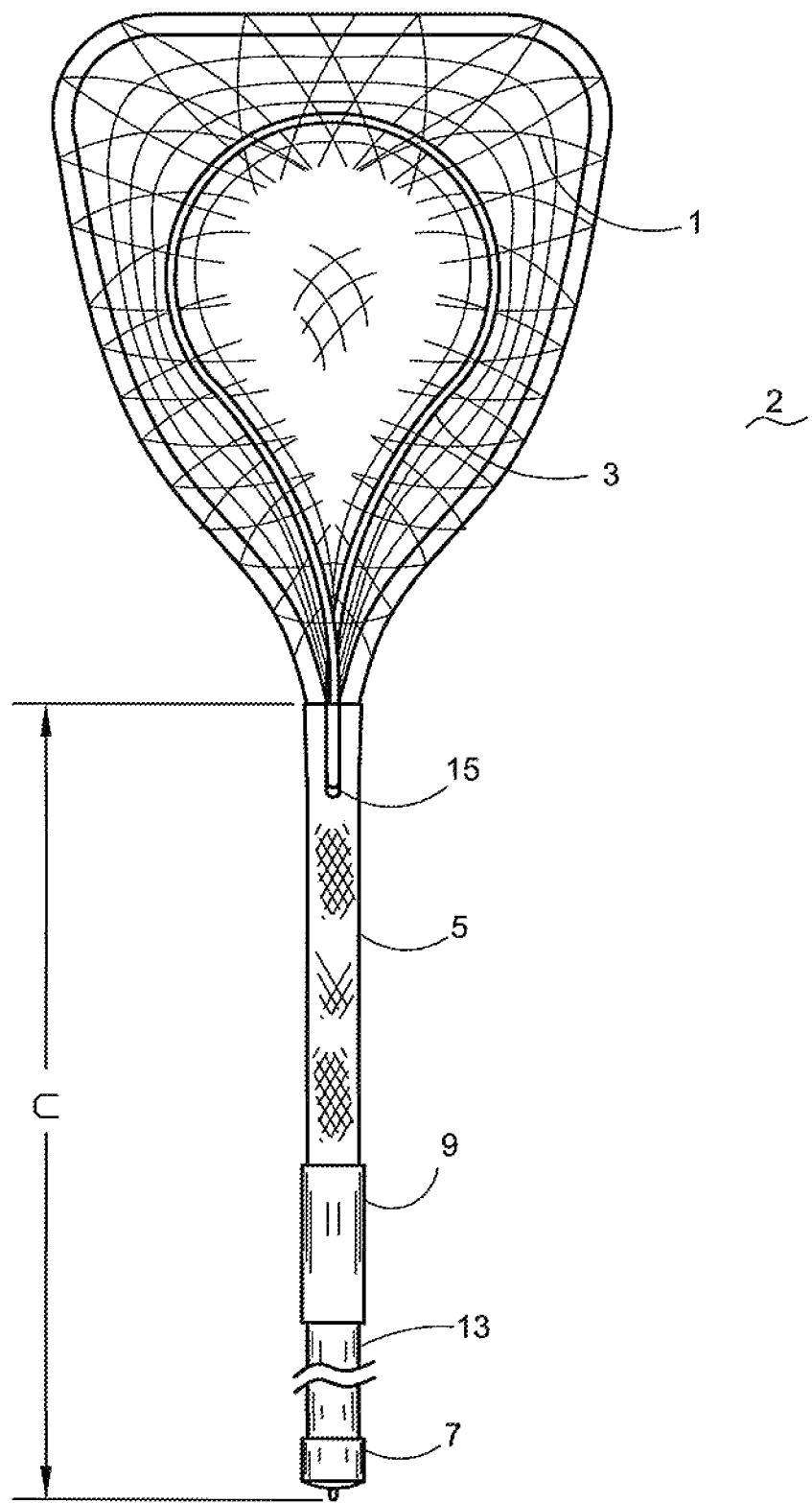
FIG. 5 is a top view of the net assembly with the snare handle and draw stem extended and the net in a closed position.

The net assembly 2 is depicted in FIGS. 1, 4 and 5. The net assembly 2 may also generally be referred to herein as a "net." The netting 1 is threaded around a net frame 11 and secured to the distal end of a net handle 5. A net closure cord 3 is threaded circumferentially, generally vertically midway in the weave of the netting 1 and enters the distal end of the net handle 5 at exit passage 15. See FIG. 10. The net closure cord 3 extends through the net handle 5 (see FIG. 1) and is securely attached to the snare handle 7. The snare handle is at the proximal exposed end of the telescopic draw stem. A spongy high friction net handle grip 9 is affixed on the proximal end of the net handle 5 and contacts the snare handle 7 (on the proximal end of the telescopic draw stem) when the netting 1 is in the open position. The snare handle 7 is attached to a telescopic draw stem 13 which slidably engages inside the net handle 5 and sheathes the net closure cord 3. Cord 3 runs through the handle pieces 5 and to some degree 13. The net handle 5 and the telescopic draw stem 13 are elongated hollow tubes, typically composed of aluminum. The net handle 5 and telescopic draw stem 13 are preferably rippled or textured aluminum. Due to the close fit of stem 13 in handle 5, there is a drag or resistance when extending the telescoping draw stem 13, which is caused by the friction of the ripple or textured pattern on the surface of the telescopic draw stem 13 as it is pulled against the ripple or textured pattern on the inside of the surface of the net handle 5.

Figure 7:
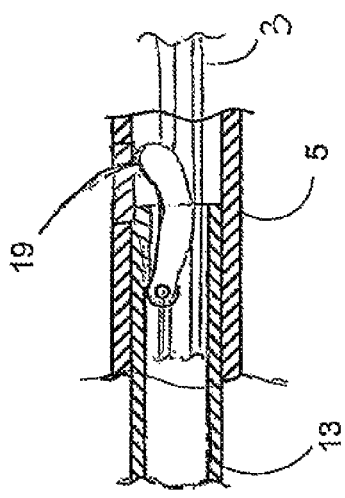
FIG. 7 is a detailed cross-sectional view of the net handle showing the spring loaded button on the end of the telescopic draw stem.
Figure 8:
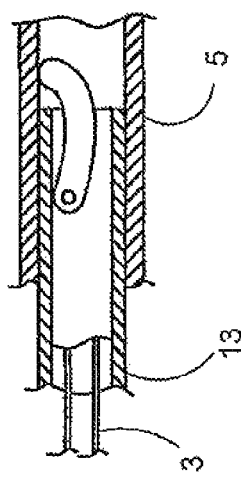
FIG. 8 a detailed cross-sectional view of the net handle showing the spring loaded button on the distal end of the telescopic draw stem engaging the internal textured surface of the net handle.

Additionally, as shown in FIGS. 7 and 8, an internal spring loaded button 19 may be used to provide additional friction and resistance when extending the snare handle 7 and closing the netting 1. The spring loaded button 19 is on the distal end of the telescopic stem 13 and frictionally engages the textured interior surface of the net handle 5 to resist movement there between due to frictional engagement of the spring loaded button 19 on the telescopic stem 13 and net handle 5 textured surface. The spring loaded button 19 on the distal end of the telescopic stem 13 may also be used to frictionally engage the interior of the net handle 5 when the interior of the net handle 5 is relatively smooth as depicted in FIG. 7.

As shown in FIG. 5, the snare handle 7 is proximally pulled and retracted away from handle 5 by a user when the user desires to close the netting 1. Retracting the snare handle 7 from handle 5 causes the net closure cord 3 to draw the netting 1 together to a closed position. The net closure cord 3 is attached to the snare handle 7 such that when the snare handle 7 is retracted, the net closure cord 3 is pulled with it and the net closure cord 3 cinches up the netting 1 into a closed position. The mechanics of the net assembly 2 with a snare closure are not complex, which is a great benefit to ensure its continued operation as the device is repeatedly exposed to water, and salt water specifically. The present invention does not employ intricate components which are subject to corrosion or deterioration due to salt or excessive use.

Figure 2:
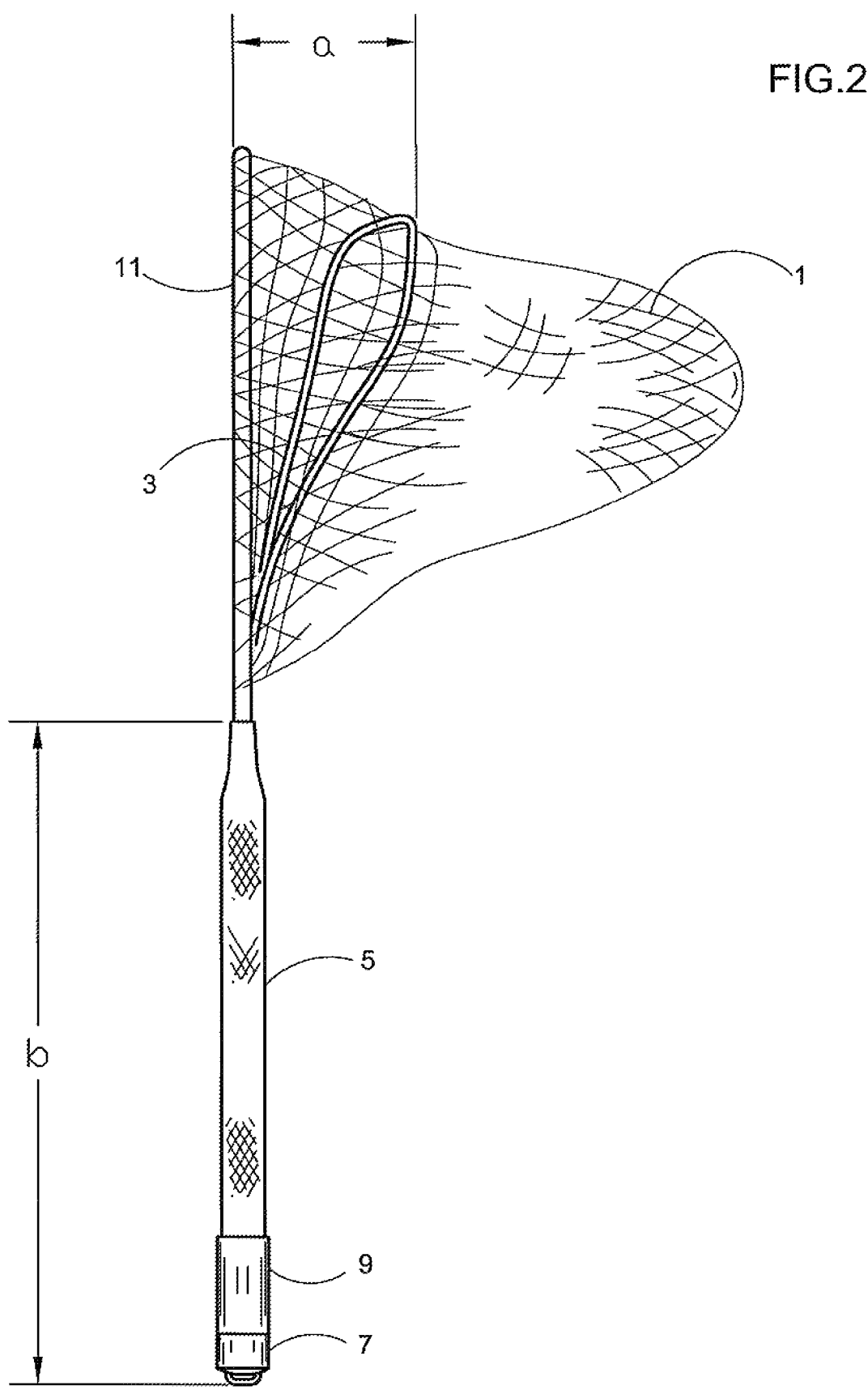
FIG. 2 is a right side view of the net assembly (the left side view being a mirror image of the right view).
Figure 3:
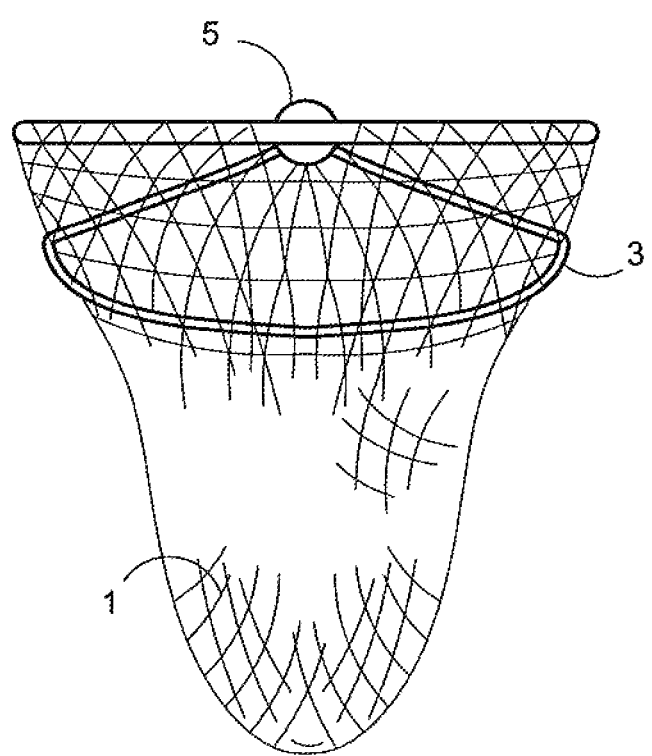
FIG. 3 is a front view of the net assembly.

As shown in FIG. 2, in the preferred embodiment, the net handle 5 is approximately 20 inches long (identified as length b). In FIGS. 2 and 3, the net closure cord 3 lies approximately 7 inches (identified as length a) measured vertically from the net frame 11 at the circumference point opposite the net handle 5. As shown in FIG. 5, the net handle 5 and the telescopic stem 13 are approximately 27 inches long (identified as length c) when the snare handle 7 and the telescopic draw stem 13 are fully retracted and the netting 1 is in the closed position. Thus, the net assembly 2 is approximately 7 inches longer in total length when the netting 1 is in the closed position. The overall increase in length will vary depending upon the size of the embodiment of the net assembly, but generally the length increases from between 5-10 inches as the telescopic draw stem 13 is withdrawn from the net handle 5 and the netting 1 is closed. The length of increase of the net assembly 2 is directly related to the size of the net and the length of the net handle 5 and the telescopic draw stem 13. The relative size of the handle 5 with respect to the snare handle 7 and attached draw stem 13 is one of the several important features of the present invention.

As shown in FIG. 1 and FIG. 4, a user will begin use of the net assembly 2 with the telescopic draw stem 13 completely encased within the net handle 5. As such, the snare handle 7 will be in contact with the spongy high friction net handle grip 9 of the net handle 5. When the user would like to close the netting 1, likely after he/she has caught something within the containment of the netting 1, the user will pull or retract the snare handle 7 toward themselves. While one of the user's hands pulls the snare handle 7 out, the other hand typically grasps the spongy high friction net handle grip 9. As shown in FIG. 5, this will cause the snare handle 7 to separate from the spongy high friction net handle grip 9 and net handle 5, as the telescopic draw stem 13 is slidably removed from the net handle 5. As the telescopic draw stem 13 slides out toward the user, the net closure cord 13, which is attached to the snare handle 7, is drawn taught and the net closure cord 13 cinches the netting 1 to a closed position. As the netting 1 is drawn closed and the telescopic draw stem 13 is extended out of the net handle 5, the overall length of the net assembly 2 is increased. In the preferred embodiment, the overall length of the net assembly 2 is increased by about 5-10 inches. Closure of the netting 1 requires two hands, one to hold the net handle 5 at the spongy high friction net handle grip 9 and one to retract the snare handle 7. Due to the operations described above, the length of handle 5 and stem 13 is important.

Figure 6:
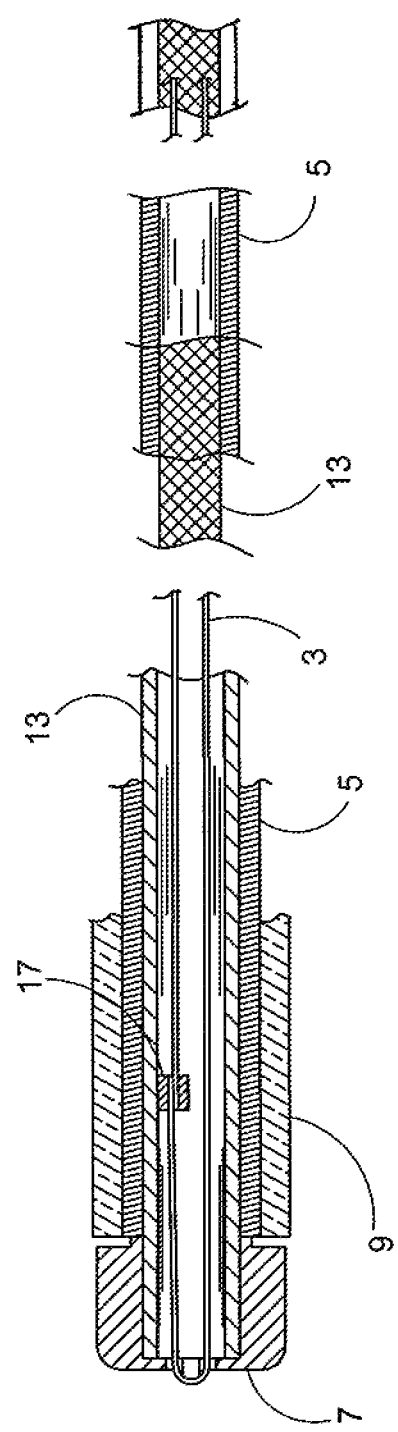
FIG. 6 is a cross-sectional view of the net handle with the netting in the open position (the snare handle end being adjacent the proximal end of the net handle).

FIG. 6 is an exposed view of the net handle 5 with the netting 1 in the open position and the telescopic draw stem 13 fully incased by the net handle 5. The snare handle 7 is attached to the proximal end of the telescopic draw stem 13. The spongy high friction net handle grip 9 surrounds the proximal end of the net handle 5. The snare handle 7 is adjacent the spongy high friction net handle grip 9 when the netting 1 is in the open position. The net closure cord 3 is shown sheathed by the telescopic draw stem 13. The net closure cord 3 is connected to itself by a press fit tube joint 17 so that the net closure cord 3 forms a continuous cord within the net assembly 2. The net closure cord 3 is attached to the snare handle 7. In the preferred embodiment, the net closure cord 3 is hooked through the top of the snare handle 7 by exiting the top of the snare handle and entering back through the top of the snare handle 7, as shown in FIG. 6.

Figure 9:
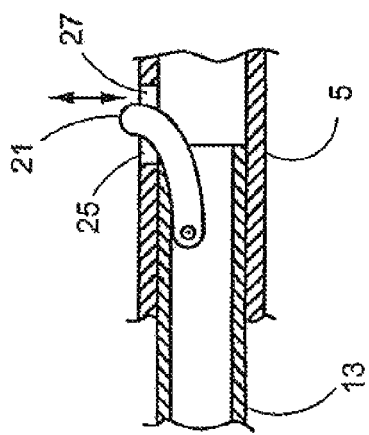
FIG. 9 is a detailed cross-sectional view of the net handle showing a spring loaded button lock which locks the telescoping draw stem with respect to the net handle.

In FIG. 9, the internal spring loaded button lock 21 is shown wherein it provides a releaseable lock between the telescopic draw stem 13 and the net handle 5. The internal spring loaded button lock 21 can lock the net assembly 2 whereby the netting 1 is locked in a closed position. In order to accomplish this, the telescopic draw stem 13 is fully retracted from the inside of the net handle 5. Aperture 25 goes through net handle 5 and aperture 27 goes through telescopic draw stem 13. Internal spring loaded button lock 21 is attached to the inside of telescopic draw stem 13 and the button portion thereof extends through aperture 27. When the telescopic draw stem 13 is fully retracted from the inside of net handle 5, the apertures 25 and 27 align and the internal spring loaded button lock 21 passes through the apertures 25 and 27 and locks the net assembly 2 in the position where the netting 1 is closed. To unlock the net assembly 2, the user pushes the internal spring loaded button lock 21 until is retracted back through the apertures 25 and 27. Once the internal spring loaded button lock 21 is retracted, the user can push the telescopic draw stem 13 back into the net handle 5 to open the netting 1. The spring loaded button lock 21 can also function as a stop for the telescoping draw stem 13 and prevent overextending the telescoping draw stem 13.

In the preferred embodiment, the net closure cord 3 is brightly colored orange or red, or alternatively any bright color, so that it is clearly visible underwater. The netting 1 is typically green to blend in with the underwater surroundings. When the net closure cord 3 is brightly colored, the underwater user can visibly see that the netting 1 is in the closed position and that it remains in the closed position until the underwater user surfaces and releases the catch.

In the preferred embodiment, the net closure cord 3 is a plastic material. In one embodiment, the net closure cord 3 can be made from weed eater line of 0.080 inch line. The plastic material allows the net closure cord 3 to rapidly cinch the netting 1 without getting caught in the netting 1 material. The plastic material of the net closure cord 3 also allows the net closure cord 3 to easily slide within the net handle 5 and not get caught up in the distal end of the net handle 5 where the net frame 11 attaches to the net handle 5. The net closure cord 3 can be made of any suitable material that serves to easily pass through the netting 1 when the net assembly 2 is quickly closed.

Figure 10:
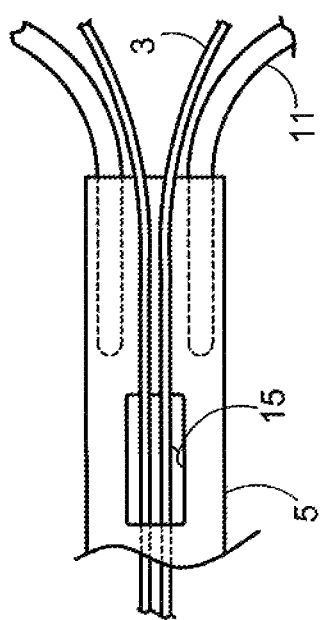
FIG. 10 is a detailed view of the portion of the connection between the net handle and the net frame and showing the exit passage for the net closure cord.

As shown in FIG. 10, the net frame 11 is crimped into the metal at the distal end of the net handle 5. Above the crimping of the net handle 5, there is an exit passage 15 for the net closure cord 3. The net closure cord 3 exits the interior of the net handle 5 at exit passage 15. The net closure cord 3 then runs on the outer surface of the crimped net handle 5 and extends beyond the net handle and forms a continuous loop that is threaded through the netting 1 circumferentially midway through the vertical weave of the netting 1.

The claims appended hereto are meant to cover modifications and changes within the scope and spirit of the present invention.

What is claimed is:

1. A hand-carried fish and lobster net assembly with a snare closure comprising:
   a net handle adapted to be held by a user;
   a net frame attached to the net handle;
   netting attached to the net frame and secured to a distal end of the net handle, wherein a weave of the netting forms an area of containment;
   a telescopic draw stem slidably engaging inside the net handle with a proximal end of the telescopic draw stem defining a snare handle, wherein each of the telescopic draw stem and the net handle have a textured surface and the telescopic draw stem and the net handle are frictionally engaged together to resist movement there between due to frictional engagement of the textured surfaces of the telescopic draw stem and the net handle;
   a spring loaded button on a distal end of the telescopic draw stem that frictionally engages an interior surface of the net handle to resist movement there between due to frictional engagement of the spring loaded button on the telescopic draw stem and the interior surface of the net handle;
   a net closure cord comprising a bright color which contrasts with a netting color, said closure cord sheathed within said telescopic draw stem and said net handle;
   said net closure cord extending beyond both the telescopic draw stem and the net handle and forming a continuous loop into the netting, outboard of the telescopic draw stem and the net handle, wherein the net closure cord is attached to the snare handle, extends through the net handle, and the continuous loop is threaded through the netting continuously midway through a vertical weave of the netting; and
   wherein to close the netting, the snare handle is proximally pulled by a user, causing the net closure cord to draw the netting together to a closed position as the snare handle and telescopic draw stem are retracted from the net handle thereby increasing an entire length of the net assembly.

2. The net assembly of claim 1, wherein said interior surface of said net handle is the textured surface of the net handle such that the spring loaded button on the distal end of the telescopic draw stem frictionally engages the interior surface of the net handle to resist movement there between due to frictional engagement of the spring loaded button on the telescopic draw stem and the interior textured surface of the net handle.

3. The net assembly of claim 1, wherein the net closure cord is made of plastic.

4. The net assembly of claim 1, wherein the net handle and the telescopic draw stem are elongated aluminum hollow tubes.

5. The net assembly of claim 1, further comprising an internal spring loaded button lock that can releaseably lock the telescopic draw stem and the net handle together when the telescopic draw stem is retracted and the netting is in the closed position.

6. The net assembly of claim 5, wherein the internal spring loaded button lock can also be a stop to prevent the telescopic draw stem from being overextended.

7. The net assembly of claim 1, wherein retracting the snare handle and the telescopic draw stem results in the netting forming a containment area within the area of containment from which a catch cannot escape.

8. The hand-carried fish and crustacean net assembly with a snare closure for use underwater to form a containment area from which a fish and crustacean cannot escape comprising:
   a net handle adapted to be held by a user, wherein the net handle comprises an elongated hollow tube of textured aluminum;
   a net frame attached to the net handle;
   netting attached to the net frame, wherein a weave of the netting forms an area of containment that is substantially open at an opening of the net frame;
   a telescopic draw stem comprising an elongated hollow tube of textured aluminum, wherein the telescopic draw stem slidably engages inside the net handle with a proximal end of the telescopic draw stem defining a snare handle and wherein the telescopic draw stem and the net handle are frictionally engaged together to resist movement there between due to frictional engagement of textured aluminum surfaces on the telescopic draw stem and the net handle;
   a spring loaded button on a distal end of the telescopic draw stem which frictionally engages the textured surface of the net handle to resist movement there between due to frictional engagement of the spring loaded button and the textured surface of the net handle;
   a net closure cord comprising a bright red or orange color, attached to the snare handle and partially sheathed within the telescopic draw stem and the net handle and extending beyond the telescopic draw stem and the net handle in the form of a continuous loop that is threaded through the netting circumferentially, midway through the weave of the netting; and
   wherein to close the netting, the snare handle is proximally pulled by a user, causing the net closure cord to draw the netting together into a closed position as the snare handle and telescopic draw stem are retracted from the net handle thereby increasing an entire length of the net assembly.

9. The net assembly of claim 8, wherein the net closure cord is made of plastic.

10. The net assembly of claim 8, further comprising an internal spring loaded button lock that can releaseably lock the telescopic draw stem and the net handle together when the telescopic draw stem is retracted and the netting is in the closed position.

11. The net assembly of claim 10, wherein the internal spring loaded lock button can also be a stop to prevent the telescopic draw stem from being overextended.

12. A hand-carried fish and crustacean net assembly with a snare closure for use underwater to form a containment area from which a fish and crustacean cannot escape comprising:
   a net handle adapted to be held by a user, wherein the net handle comprises an elongated hollow tube of textured aluminum;
   a net frame attached to the net handle;
   netting attached to the net frame, wherein a weave of the netting forms an area of containment that is substantially open at an opening of the net frame;
   a telescopic draw stem comprising an elongated hollow tube of textured aluminum, wherein the telescopic draw stem slidably engages inside the net handle with a proximal end of the telescopic draw stem defining a snare handle and wherein the telescopic draw stem and the net handle are frictionally engaged together to resist movement there between due to frictional engagement of textured surfaces on the telescopic draw stem and the net handle;

a spring loaded button on the distal end of the telescopic draw stem which frictionally engages the textured surface of the net handle to resist movement there between due to frictional engagement of the spring loaded button and the net handle textured surface;

an internal spring loaded button lock that can releaseably lock the telescopic draw stem and the net handle together, wherein the lock holds the netting in the closed position until the internal spring loaded button lock is released;

a net closure cord comprising a bright red or orange colored plastic, attached to the snare handle and partially sheathed within the telescopic draw stem and the net handle and extending beyond the telescopic draw stem and the net handle in the form of a continuous loop that is threaded through the netting circumferentially, midway through the weave of the netting; and wherein to close the netting, the snare handle is proximally pulled by a user, causing the net closure cord to draw the netting together into the closed position as the snare handle and telescopic draw stem are retracted from the net handle thereby increasing an entire length of the net assembly by about 5 to 10 inches.

13. The net assembly of claim 12, wherein the net handle is about 20 inches long when the netting is in an open position.

14. The net assembly of claim 12, wherein the net handle and the telescopic draw stem together are about 27 inches in length when the telescopic draw stem is fully extended from the net handle and the netting is in the closed position.

* * * * *